(12) United States Patent
Yuzawa (10) Patent No.: US 10,480,158 B2
(45) Date of Patent: Nov. 19, 2019

(54) WORKING MACHINE

(71) Applicant: SUMITOMO (S.H.I.) CONSTRUCTION MACHINERY CO., LTD., Tokyo (JP)

(72) Inventor: Yoshimitsu Yuzawa, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 77 days.

(21) Appl. No.: 15/590,333

(22) Filed: May 9, 2017

(65) Prior Publication Data

US 2017/0241105 A1 Aug. 24, 2017

Related U.S. Application Data

(63) Continuation of application No. PCT/JP2015/081542, filed on Nov. 10, 2015.

(30) Foreign Application Priority Data

Nov. 10, 2014 (JP) .................................. 2014-228404

(51) Int. Cl.
*F15B 11/02* (2006.01)
*F15B 11/042* (2006.01)
(Continued)

(52) U.S. Cl.
CPC .............. *E02F 9/22* (2013.01); *E02F 9/2235* (2013.01); *E02F 9/2282* (2013.01);
(Continued)

(58) Field of Classification Search
CPC ......... F15B 11/165; F15B 11/167; E02F 9/22; E02F 9/2235
(Continued)

(56) References Cited

U.S. PATENT DOCUMENTS

| | | | |
|---|---|---|---|
| 5,540,050 A | 7/1996 | Krupowicz | |
| 5,940,997 A * | 8/1999 | Toyooka | E02F 9/2221 |
| | | | 37/411 |

(Continued)

FOREIGN PATENT DOCUMENTS

| | | |
|---|---|---|
| JP | 2000-281275 | 10/2000 |
| JP | 2002-089511 | 3/2002 |

(Continued)

OTHER PUBLICATIONS

Machine Translation of JP2009-097668A. 2009.*
International Search Report for PCT/JP2015/081542 dated Dec. 22, 2015.

*Primary Examiner* — Michael Leslie
*Assistant Examiner* — Daniel S Collins
(74) *Attorney, Agent, or Firm* — IPUSA, PLLC (57) ABSTRACT

A working machine is disclosed. A boom supports an arm. An upper revolving body supports the boom. A lower traveling body mounts the upper revolving body in a rotatable state. A hydraulic actuator drives a hydraulic oil while relieving the hydraulic oil. A first pump supplies the hydraulic oil to the hydraulic actuator. A pump state detector detects load of the first pump. A controller reduces a flow rate of the hydraulic oil from the first pump to the hydraulic actuator when the pump state detector detects a predetermined state.

8 Claims, 9 Drawing Sheets

(51) Int. Cl.
    *E02F 9/22*          (2006.01)
    *F15B 11/08*       (2006.01)
    *F16D 31/02*       (2006.01)
    *F16D 31/08*       (2006.01)
    *E02F 3/413*       (2006.01)

(52) U.S. Cl.
    CPC .......... *E02F 9/2285* (2013.01); *E02F 9/2292* (2013.01); *E02F 9/2296* (2013.01); *F15B 11/02* (2013.01); *F15B 11/042* (2013.01); *F15B 11/08* (2013.01); *F16D 31/02* (2013.01); *F16D 31/08* (2013.01); *E02F 3/413* (2013.01)

(58) Field of Classification Search
    USPC .................................................. 60/420, 422
    See application file for complete search history.

(56) References Cited

U.S. PATENT DOCUMENTS

| | | |
|---|---|---|
| 2012/0227391 A1* | 9/2012 | Bang ................ E02F 9/123 60/327 |
| 2012/0260646 A1 | 10/2012 | Nishikawa et al. |
| 2013/0121852 A1 | 5/2013 | Joung et al. |
| 2013/0255243 A1 | 10/2013 | Shiratani et al. |
| 2014/0060020 A1 | 3/2014 | Peterson et al. |

FOREIGN PATENT DOCUMENTS

| | | |
|---|---|---|
| JP | 2009-097668 | 5/2009 |
| JP | 2010-031978 | 2/2010 |
| JP | 2012-141705 | 7/2012 |
| JP | 2013-213315 | 10/2013 |
| JP | 2013-538321 | 10/2013 |

\* cited by examiner

WORKING MACHINE

RELATED APPLICATION

This application is a continuation application filed under 35 U.S.C. 111(a) claiming the benefit under 35 U.S.C. 120 and 365(c) of a PCT International Application No. PCT/JP2015/081542 filed on Nov. 10, 2015, which is based upon and claims the benefit of priority of the prior Japanese Patent Application No. 2014-228404 filed on Nov. 10, 2014, the entire contents of which are incorporated herein by reference.

BACKGROUND

Technical Field

The present invention relates to a working machine equipped with a relief valve for discharging at least a part of hydraulic oil toward a hydraulic actuator.

Description of Related Art

A shovel equipped with a revolving hydraulic circuit has been known to control drive of a revolving hydraulic motor. This revolving hydraulic circuit includes two high pressure oil passages connected to two ports of the revolving hydraulic motor, and a make-up oil passage for connecting these two high pressure oil passages to hydraulic oil tanks. A high pressure relief valve is arranged between the high pressure oil passages and the make-up oil passage. By this configuration, the revolving hydraulic circuit accelerates the revolving hydraulic circuit by a remaining hydraulic oil while exhausting a part of a hydraulic oil supplied from a hydraulic pump to the hydraulic oil tanks via the high pressure relief valve.

SUMMARY

According to the embodiment, there is provided a working machine including: an arm; a boom that supports the arm; an upper revolving body that supports the boom; a lower traveling body that mounts the upper revolving body in a rotatable state; a hydraulic actuator that drives a hydraulic oil while relieving the hydraulic oil; a first pump that supplies the hydraulic oil to the hydraulic actuator; a pump state detector that detects load of the first pump; and a controller that reduces a flow rate of the hydraulic oil from the first pump to the hydraulic actuator when the pump state detector detects a predetermined state.

DETAILED DESCRIPTION

However, when accelerating the revolving oil pressure motor, the above described revolving hydraulic circuit wastefully consumes hydraulic energy by exhausting a part of a hydraulic oil to a hydraulic oil tank.

In view of the above, it is desirable to provide a working machine capable of reducing the amount of the hydraulic oil discharged from a relief valve during an operation of a hydraulic actuator.

Figure 1:
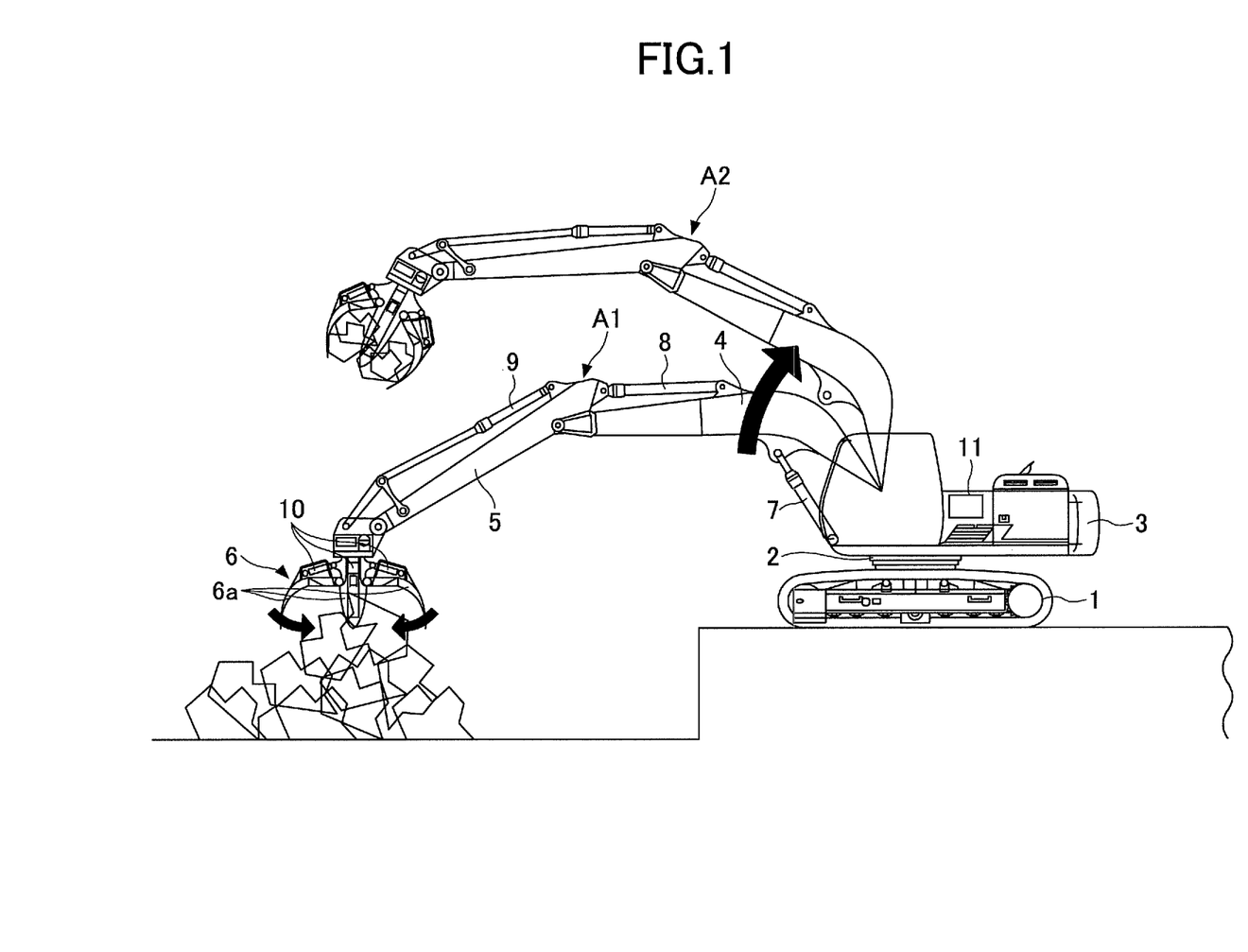
FIG. 1 is a side view of a working machine according to an embodiment of the present invention.

First, referring to FIG. 1, a working machine according to an embodiment of the present invention. FIG. 1 is a side view of a working machine. An upper revolving body 3 is mounted on a lower traveling body 1 of the working machine depicted in FIG. 1 via a revolving mechanism 2. An attachment is attached to the upper revolving body 3. The attachment is composed of a boom 4, an arm 5, and a grapple 6 as a working body. Specifically, the boom 4 is attached to the upper revolving body 3. The arm 5 is attached to a front end of the boom 4, and a grapple 6 is attached as an end attachment to a tip of the arm 5. The boom 4 is rotated by a boom cylinder 7, and the arm 5 is rotated by an arm cylinder 8. The grapple 6 is rotated by a bucket cylinder (cylinder for grapple tilt) 9, and a claw 6a is opened and closed by a grapple opening/closing cylinder 10. The bucket cylinder 9 is a general hydraulic cylinder that rotates a bucket when the bucket is used, instead of the grapple 6, and is used to rotate (tilt) the grapple 6. A cabin is provided on the upper revolving body 3, and an engine 11 and the like are mounted thereon. FIG. 1 simultaneously illustrates a state A1 of the attachment while gripping a work target with the grapple 6, and a state A2 of the attachment when lifting up after gripping the work target with the grapple 6.

Figure 2:
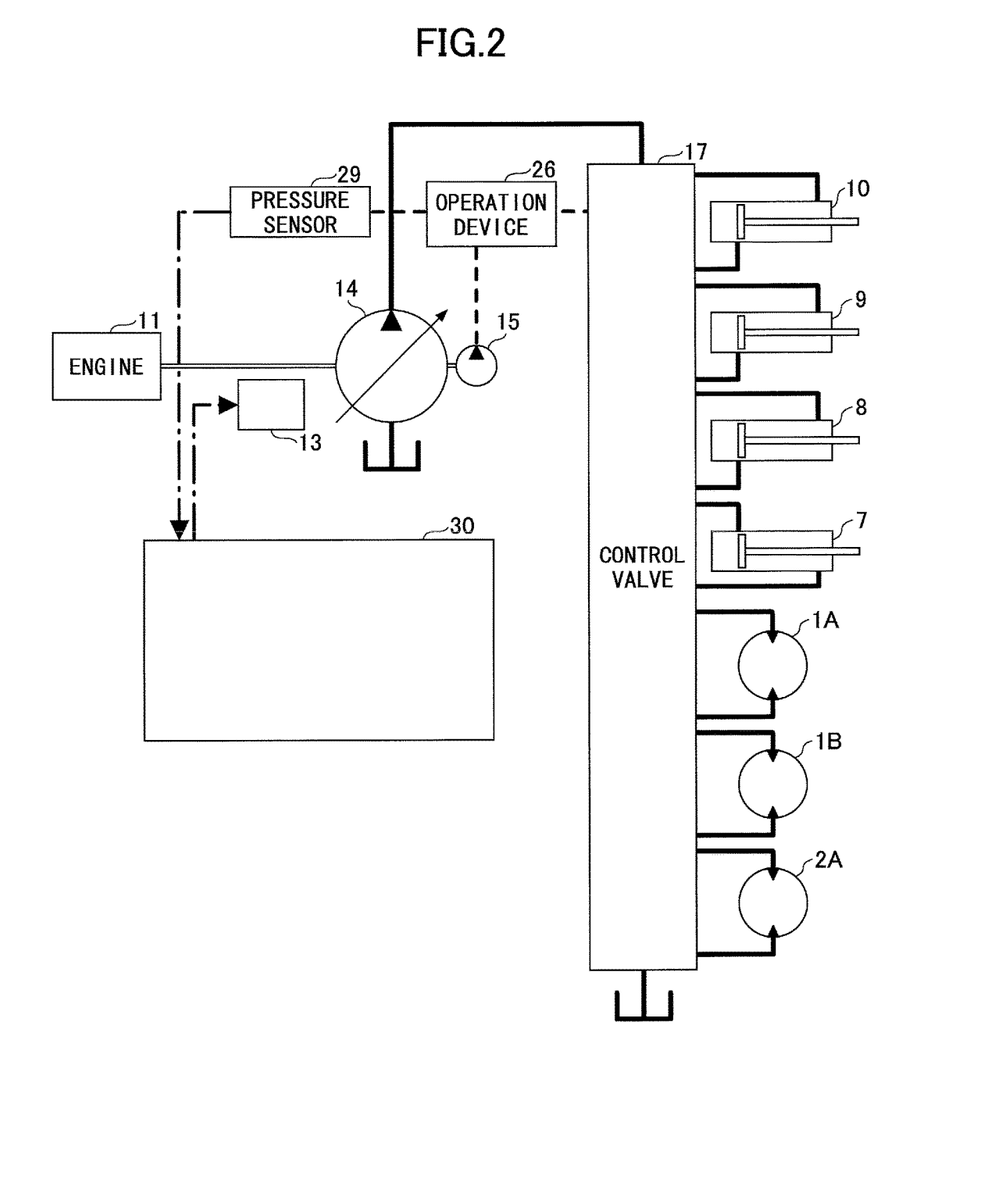
FIG. 2 is a block diagram illustrating a configuration example of a drive system of the working machine in FIG. 1.

FIG. 2 is a block diagram illustrating a configuration example of a drive system of the working machine in FIG. 1, wherein a mechanical power system, a high pressure hydraulic line, a pilot line, and an electric control system are indicated by a double line, solid lines, dashed lines, and one-dot chain lines, respectively.

The driving system of the working machine mainly includes the engine 11, a regulator 13, a main pump 14, a pilot pump 15, a control valve 17, an operating device 26, a pressure sensor 29, and a controller 30.

The engine is a driving source of the working machine. In the present embodiment, the engine 11 is a diesel engine as an internal combustion engine which operates so as to maintain a predetermined rotational speed. An output shaft of the engine 11 is connected to input shafts of the main pump 14 and the pilot pump 15.

The main pump 14 supplies the hydraulic oil to the control valve 17 via the high pressure hydraulic line. In the present embodiment, the main pump 14 is a swash plate type variable displacement hydraulic pump.

The regulator 13 controls a discharge amount of the main pump 14. In the present embodiment, the regulator 13 controls the discharge amount of the main pump 14 by adjusting a swash plate tilt angle of the main pump 14 according to a control signal from the controller 30.

The pilot pump 15 supplies the hydraulic oil to the operating device 26 via the pilot line. In the present embodiment, the pilot pump 15 is a fixed capacity hydraulic pump.

The control valve 17 is a hydraulic control device for controlling the hydraulic system in the working machine. In the present embodiment, with respect to one or more of the control valve 17 is connected to the boom cylinder 7, the arm cylinder 8, the bucket cylinder 9, the grapple opening and closing cylinder 10, a left side traveling hydraulic motor 1A, a right side traveling hydraulic motor 1B, and a revolving hydraulic motor 2A, the hydraulic oil discharged from the main pump 14 is selectively supplies. Hereinafter, the boom cylinder 7, the arm cylinder 8, the bucket cylinder 9, the grapple opening and closing cylinder 10, the left side traveling hydraulic motor 1A, the right side traveling hydraulic motor 1B, and the revolving hydraulic motor 2A are collectively referred to as "hydraulic actuator".

The operating device 26 is a device used by an operator for operating the hydraulic actuator. In the present embodiment, the operating device 26 supplies the hydraulic oil discharged from the pilot pump 15 to the pilot port of the control valve in the control valve 17. Specifically, the operating device 26 supplies the hydraulic oil discharged from the pilot pump 15 to pilot ports of the control valves corresponding to the respective hydraulic actuators. The pressure (pilot pressure) of the hydraulic oil supplied to each of the pilot ports is a pressure corresponding to an operation direction and an operation amount of a lever or a pedal of the operation device 26 corresponding to each of the hydraulic actuators.

The pressure sensor 29 is an example of an operation content detection unit for detecting the operation content of the operation device 26. In the present embodiment, the pressure sensor 29 detects the operation direction and the operation amount of the operation device 26 corresponding to each of the hydraulic actuators in a form of pressure, and outputs respective detected values to the controller 30. The operation content of the operation device 26 may be detected by using a sensor other than the pressure sensor, such as a tilt sensor for detecting an inclination for each of various operation levers. Specifically, the pressure sensor 29 is attached to each of the operation devices 26 such as a left travel lever, a right travel lever, an arm operation lever, a turn operation lever, a boom operation lever, a grapple tilt operation lever, a grapple opening/closing pedal, and the like.

The controller 30 is a control device for controlling the work machine. In the present embodiment, the controller 30 includes a computer having a CPU, a RAM, a ROM, and the like. The controller 30 reads programs corresponding to various functional elements from the ROM, loads them into the RAM, and causes the CPU to execute processes corresponding to various functional elements.

Based on an output of the pressure sensor 29, the controller 30 electrically detects each operation content of the operation device 26 (for example, presence or absence of a lever operation, a lever operation direction, a lever operation amount, and the like).

Figure 3:
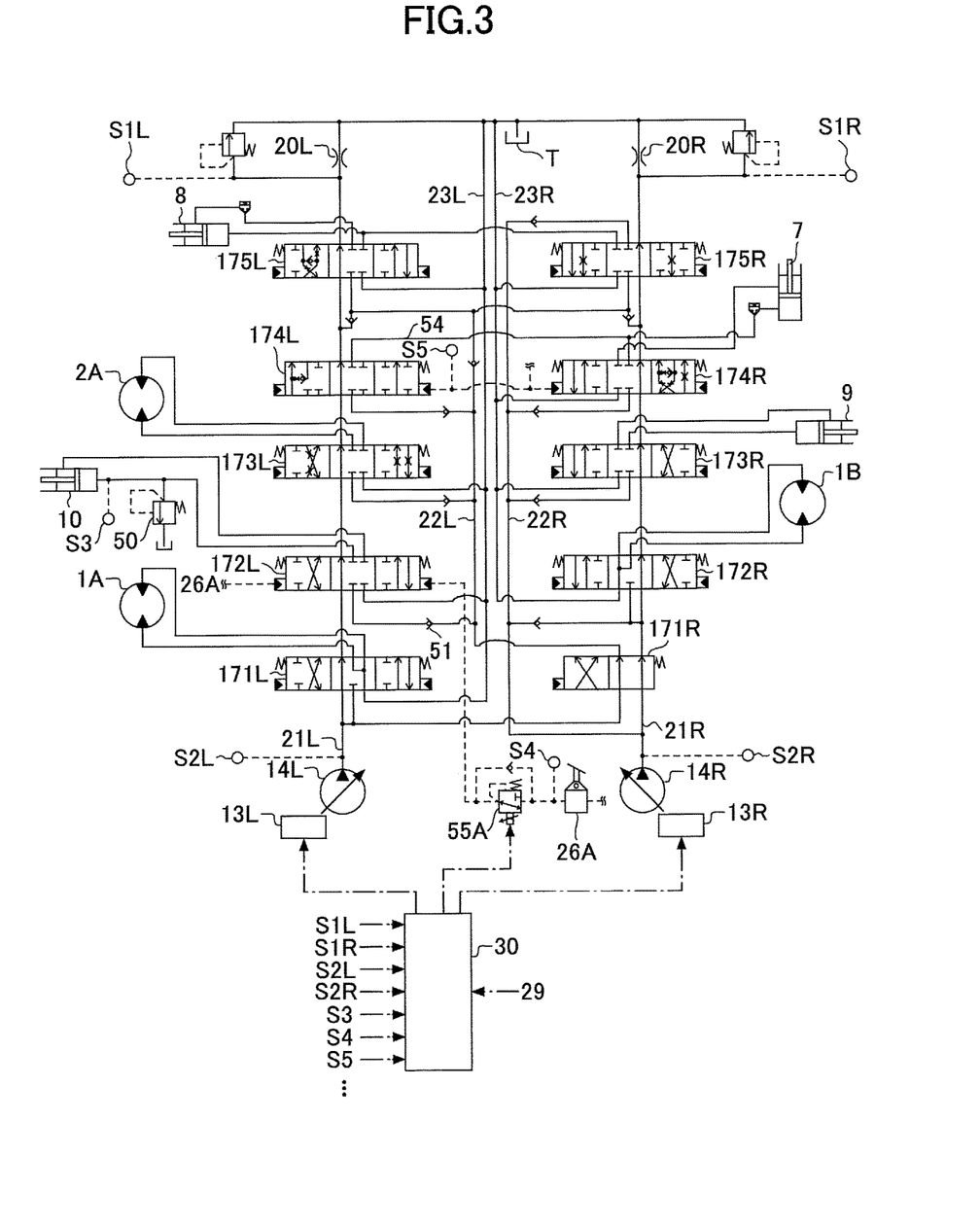
FIG. 3 is a schematic view illustrating a configuration example of a hydraulic circuit mounted on the working machine in FIG. 1.

Next, with reference to FIG. 3, a configuration example of a hydraulic circuit mounted on the working machine in FIG. 1 will be described. FIG. 3 is a diagram illustrating a configuration example of the hydraulic circuit mounted on the working machine in FIG. 1. In FIG. 3, similar to FIG. 2, the high pressure hydraulic line, the pilot line, and the electric control system are indicated by the solid lines, the broken lines, and the one-dot chain lines, respectively.

Regulators 13R and 13L control discharge amounts of main pumps 14R and 14R, respectively. The regulators 13R and 13L control the discharge amounts of the main pumps 14R and 14R by adjusting swash plate tilt angles of the main pumps 14R and 14R according to control signals from the controller 30, respectively. The main pumps 14L and 14R are variable displacement type hydraulic pumps driven by the engine 11 and correspond to the main pump 14 in FIG. 2. In the present embodiment, the main pump 14L circulates the hydraulic oil to the hydraulic oil tank T through a center bypass oil passage 21L passing through the control valves 171L to 175L forming the control valve 17. Moreover, the main pump 14L is capable of supplying the hydraulic oil to each of the control valves 172L to 175L through a parallel oil passage 22L extending in parallel to the center bypass oil passage 21L. Similarly, a main pump 14R circulates the hydraulic oil to the hydraulic oil tank T through a center bypass oil passage 21R passing through the control valves 171R to 175R forming the control valve 17, respectively. Furthermore, the main pump 14R is capable of supplying the hydraulic oil to each of the control valves 172R to 175R through a parallel oil passage 22R extending in parallel to the center bypass oil passage 21R. Hereinafter, the main pump 14L and the main pump 14R may be collectively referred to as "main pumps 14" below. Other components are composed as a pair of right and left in the same manner.

The control valve 171L is a spool valve that switches the flow of the hydraulic oil so as to supply the hydraulic oil discharged from the main pump 14L to the left traveling hydraulic motor 1A when a left traveling lever is operated.

The control valve 171R is a spool valve as a straight traveling valve. In the present embodiment, the straight traveling valve 171R is a 4 port 2 position spool valve, and has a first valve position and a second valve position. The first valve position includes a flow passage connecting the main pump 14L and the parallel oil passage 22L, and a flow passage connecting the main pump 14R and the control valve 172R. The second valve position includes a flow passage connecting the main pump 14R and the parallel oil path 22L, and a flow passage connecting the main pump 14L and the control valve 172R.

The control valve 172L is a spool valve that switches a flow of the hydraulic oil in order to supply the hydraulic oil discharged from the main pump 14L to a grapple opening/closing cylinder 10 when a grapple opening/closing pedal 26A is operated.

The control valve 172R is a spool valve that switches the flow of the hydraulic oil in order to supply the hydraulic oil discharged from the main pump 14R to the right traveling hydraulic motor 1B when the right traveling lever is operated.

The control valve 173L is a spool valve that switches the flow of the hydraulic oil in order to supply the hydraulic oil discharged from the main pump 14L to the revolving hydraulic motor 2A when a turning operation lever is operated.

The control valve 173R is a spool valve that switches the flow of the hydraulic oil in order to supply the hydraulic oil discharged from the main pump 14 R to the bucket cylinder 9 when the grapple tilt operation lever is operated.

The control valves 174L and 174R are spool valves that switch the flow of hydraulic oil so as to supply the hydraulic oil discharged from the main pump 14 to the boom cylinder 7 when the boom operation lever is operated. The control valve 174L additionally supplies the hydraulic oil to the boom cylinder 7 when the boom operation lever is operated in a direction raising the boom by an amount more than or equal to a predetermined lever operation amount.

The control valves 175L and 175R are spool valves that switch the flow of hydraulic oil in order to supply the hydraulic oil discharged from the main pump 14 to the arm cylinder 8 when the arm operation lever is operated. The control valve 175R additionally supplies hydraulic oil to the arm cylinder 8 when the arm operation lever is operated by an amount more than or equal to a predetermined lever operation amount.

The hydraulic oils flowing out from each of the left traveling hydraulic motor 1A, the grapple opening and closing cylinder 10, the revolving hydraulic motor 2A, and the arm cylinder 8 is discharged to the hydraulic oil tank T through a return oil passage 23L. Similarly, the hydraulic oil flowing out from each of the right travel hydraulic motor 1B, the bucket cylinder 9, and the boom cylinder 7 is discharged to the hydraulic oil tank T through a return oil passage 23R. A part of the hydraulic oil flowing out from the arm cylinder 8 may be discharged to the hydraulic oil tank T through the return oil passage 23R.

The center bypass oil passages 21L and 21R are respectively provided with negative control throttles 20L and 20R between the most downstream control valves 175L and 175R and the hydraulic oil tank T. Hereinafter, the negative control is abbreviated as "nega-con". The nega-con throttles 20L and 20R limit the flow of the hydraulic oil discharged from the main pumps 14L and 14R, and generate negative control pressures upstream of the nega-con throttles 20L and 20R. The controller 30 conducts nega-con control by using these negative control pressures. Specifically, the lower the negative control pressures generated by the nega-con throttles 20L and 20R is, the greater the discharge amounts of the main pumps 14L and 14R are increased. When the negative control pressures generated by the nega-con throttles 20L and 20R exceed a predetermined pressure, the discharge amounts of the main pumps 14L and 14R are reduced to a predetermined lower limit value.

A relief valve 50 is a valve that controls the pressure of a bottom side oil chamber of the grapple opening/closing cylinder 10 to be lower than or equal to a predetermined closing relief pressure.

A load check valve 51 is a valve that prevents the hydraulic oil in the grapple opening/closing cylinder 10 from flowing back to the parallel oil passage 22L.

The grapple opening/closing pedal 26A is one of the operating devices 26, and generates a pilot pressure (hereinafter, referred to as "grapple closing pilot pressure") acting on a pilot port on a right side (grapple closing side) of the control valve 172L, and generates a pilot pressure (hereinafter, referred to as "grapple opening pilot pressure") acting on pilot port on a left side (grapple opening side) of the control valve 172L. In the present embodiment, when a front end side (toe side) is depressed, the control valve 172L is moved leftward by increasing the grapple closing pilot pressure. When a rear end side (heel side) is depressed, the control valve 172L is moved rightward by increasing the grapple opening pilot pressure. Moreover, when depression is released, the control valve 172L is returned to a neutral position.

A pressure reducing valve 55A is a valve that adjusts the grapple closing pilot pressure generated by the grapple opening/closing pedal 26A, and adjusts the grapple closing pilot pressure depending on a magnitude of a control current from the controller 30. Specifically, the pressure reducing valve 55A receives the grapple closing pilot pressure as a primary pressure, and applies the adjusted pilot pressure as a secondary pressure to the pilot port on the right side (the grapple closing side) of the control valve 172L. The greater the control current is, the more the pressure reducing valve 55A reduces the secondary pressure.

The pressure sensors S1L and S1R detect the nega-con pressure generated upstream of the negative controllers 20L and 20R, and output the detected values to the controller 30 as electrical nega-con pressure signal.

The pressure sensors S2L and S2R are examples of pump state detectors for detecting load of a hydraulic pump. In the present embodiment, the pressure sensors S2L and S2R detect discharge pressures of the main pumps 14L and 14R, and output the detected values to the controller 30 as electric discharge pressure signals.

A pressure sensor S3 is an example of a grapple state detector that detects a state of the grapple 6. In the present embodiment, the pressure sensor S3 detects the pressure of the bottom side oil chamber of the grapple opening/closing cylinder 10 (hereinafter, referred to as "grapple bottom pressure"), and outputs the detected value as an electrical grapple bottom pressure signal to the controller 30.

A pressure sensor S4 is one of the pressure sensors 29, detects the grapple closing pilot pressure, and outputs the detected value as an electric grapple closing pilot pressure signal to the controller 30 as an electric grapple closing pilot pressure signal.

A pressure sensor S5 is one of the pressure sensors 29. The pressure sensor S5 detects the pilot pressures (hereinafter, referred to as "boom raising pressures") acting on the right side (boom raising side) pilot port of the control valve 174L and the left side (boom raising side) pilot port of the control valve 174R, and outputs the detected values as an electric boom raising pilot pressure signal to the controller 30.

The controller 30 receives the outputs of the pressure sensor 29, S1L, S1R, S2L, S2R, S3, S4, S5, and the like, and causes the CPU to execute a program for adjusting the discharge amount of each of the main pumps 14L and 14R, a program for adjusting the grapple closing pilot pressure, and the like.

In a case in which both the hydraulic actuator (for example, the grapple opening/closing cylinder 10) related to the main pump 14L and the hydraulic actuator (for example, the boom cylinder 7) related to the main pump 14R are continuously operated with a full lever or a full pedal, the controller 30 sets the discharge amount L1 of the main pump 14L and the discharge amount L2 of the main pump 14R to be the same. Hereinafter, this method will be referred to as "discharge amount tuning method". For example, the full lever or the full pedal corresponds to an operation state in which the operation amount in the neutral state of the lever/pedal is 0%, and the operation amount is 80% or more when the operation amount in a maximum operation state is set to 100%.

Figure 4:
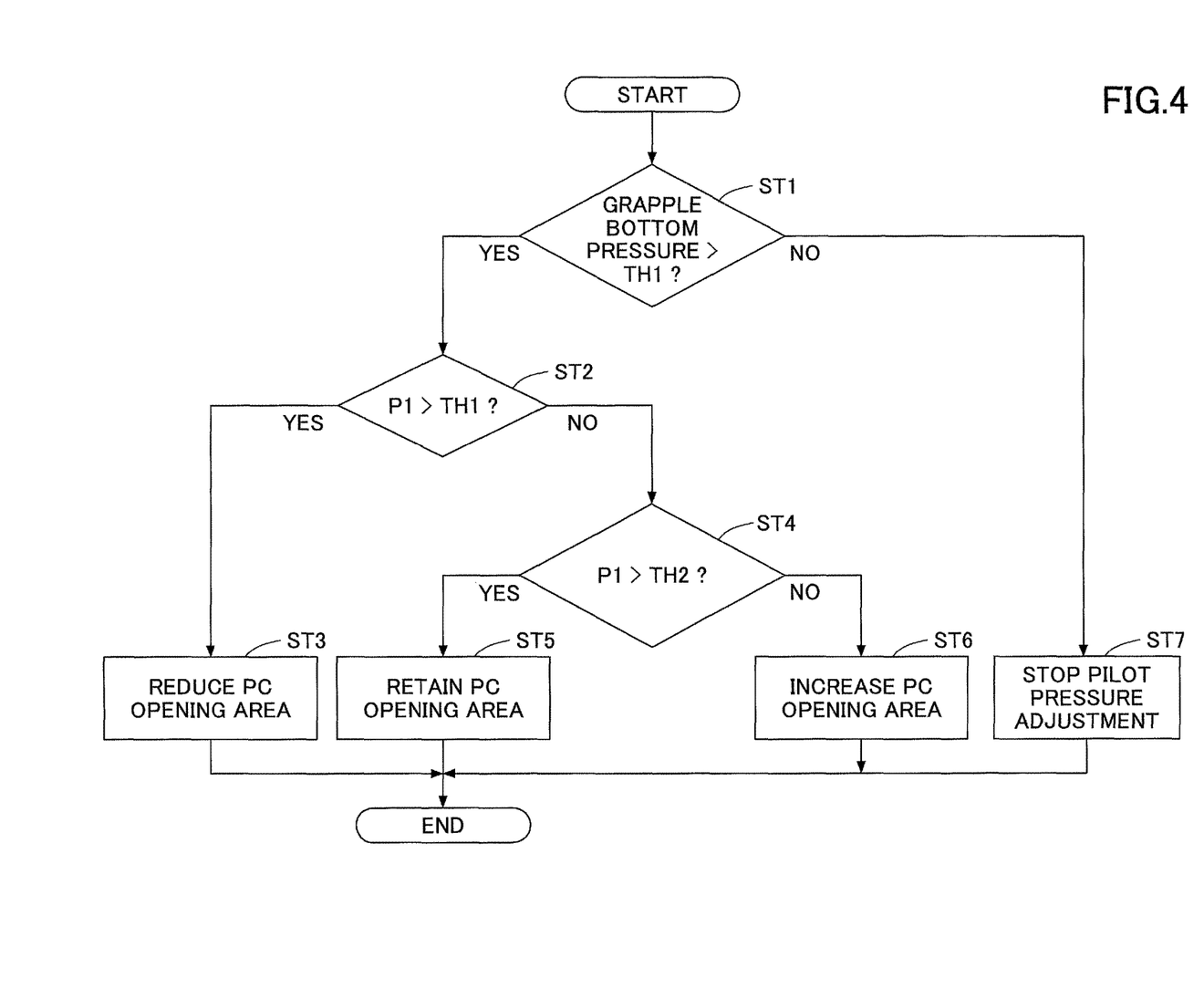
FIG. 4 is a flowchart illustrating a flow of an example of a pilot pressure adjustment process.

Next, with reference to FIG. 4, an example of a process (hereinafter, referred to as "pilot pressure adjustment process"), in which the controller 30 adjusts the grapple closing pilot pressure at time of closing the grapple 6, will be described with reference to FIG. 4. FIG. 4 is a flowchart showing an example of the pilot pressure adjustment process, in which the controller 30 repeatedly executes this pilot pressure adjustment process at a predetermined control cycle during a grapple closing operation.

First, the controller 30 determines whether the grapple bottom pressure is higher than a predetermined pressure TH1 (step ST1). In the present embodiment, the controller 30 compares the grapple bottom pressure, which is the output of the pressure sensor S3, with the predetermined pressure TH1 previously stored in the ROM or the like, and determines whether the grapple bottom pressure is higher than the predetermined pressure TH1. The predetermined pressure TH1 is a preset pressure based on the closing relief pressure, and is set to a pressure slightly lower than the closing relief pressure, for example.

If it is determined that the grapple bottom pressure is higher than the predetermined pressure TH1 (YES in step ST1), the controller 30 determines whether a discharge pressure P1 of the main pump 14L is higher than the predetermined pressure TH1 (step ST2). In the present embodiment, the controller 30 compares the discharge pressure P1 of the main pump 14L, which is the output of the pressure sensor S2L, with the predetermined pressure TH1, and determines whether the discharge pressure P1 is greater than the predetermined pressure TH1.

When it is determined that the discharge pressure P1 is larger than the predetermined pressure TH1 (YES in step ST2), the controller 30 reduces the PC opening area of the control valve 172L (step ST3). The PC opening area means the cross sectional area of the flow passage in the control valve 172L connecting the main pump 14L and the bottom side oil chamber of the grapple opening/closing cylinder 10. In the present embodiment, the controller 30 increases the control current with respect to the pressure reducing valve 55A. As the control current increases, the pressure reducing valve 55A reduces the adjusted pilot pressure acting on the pilot port on the right side (grapple closing side) of the control valve 172L.

When it is determined that the discharge pressure P1 is lower than or equal to the predetermined pressure TH1 (NO in step ST2), the controller 30 determines whether the discharge pressure P1 is greater than the predetermined pressure TH2 (step ST4). In the present embodiment, the controller 30 compares the discharge pressure P1, which is the output of the pressure sensor S2L, with the predetermined pressure TH2 previously stored in the ROM or the like, and determines whether the discharge pressure P1 is larger than the predetermined pressure TH2.

If it is determined that the discharge pressure P1 is greater than the predetermined pressure TH2 (YES in step ST4), the controller 30 maintains the PC opening area of the control valve 172L in that state (step ST5). In the present embodiment, the controller 30 fixes the magnitude of the control current with respect to the pressure reducing valve 55A at a current magnitude. The pressure reducing valve 55A maintains the magnitude of the adjusted pilot pressure acting on the pilot port on the right side (grapple closing side) of the control valve 172L at a current magnitude. In this manner, the controller 30 does not change the PC opening area depending on whether the discharge pressure P1 is larger than the predetermined pressure TH2. Instead, when the discharge pressure P1 is larger than the predetermined pressure TH2, the controller 30 maintains the PC opening area at a current opening area. Then, a condition for reducing the PC opening area is defined by using a pressure other than the predetermined pressure TH2. By controlling the pressure reducing valve 55A by using such hysteresis control, it is possible to prevent a moving direction of the control valve 172L from being frequently switched.

When it is determined that the discharge pressure P1 is lower than or equal to the predetermined pressure TH2 (NO in step ST4), the controller 30 increases the PC opening area of the control valve 172L (step ST6). In the present embodiment, the controller 30 reduces the control current for the pressure reducing valve 55A. As the control current decreases, the pressure reducing valve 55A increases the adjusted pilot pressure acting on the pilot port on the right side (grapple closing side) of the control valve 172L. As a result, the PC opening area of the control valve 172L gradually increases. The control valve 172L finally receives the grapple closing pilot pressure generated by the grapple opening/closing pedal 26A at the right side (grapple closing side) pilot port, and moves to the right position.

When it is determined that the grapple bottom pressure is less than or equal to the predetermined pressure TH1 (NO in step ST1), the controller 30 stops the pilot pressure adjustment by the pressure reducing valve 55A (step ST7). Even if a closing operation of the grapple 6 is stopped, the controller 30 also stops the pilot pressure adjustment by the pressure reducing valve 55A.

Figure 5:
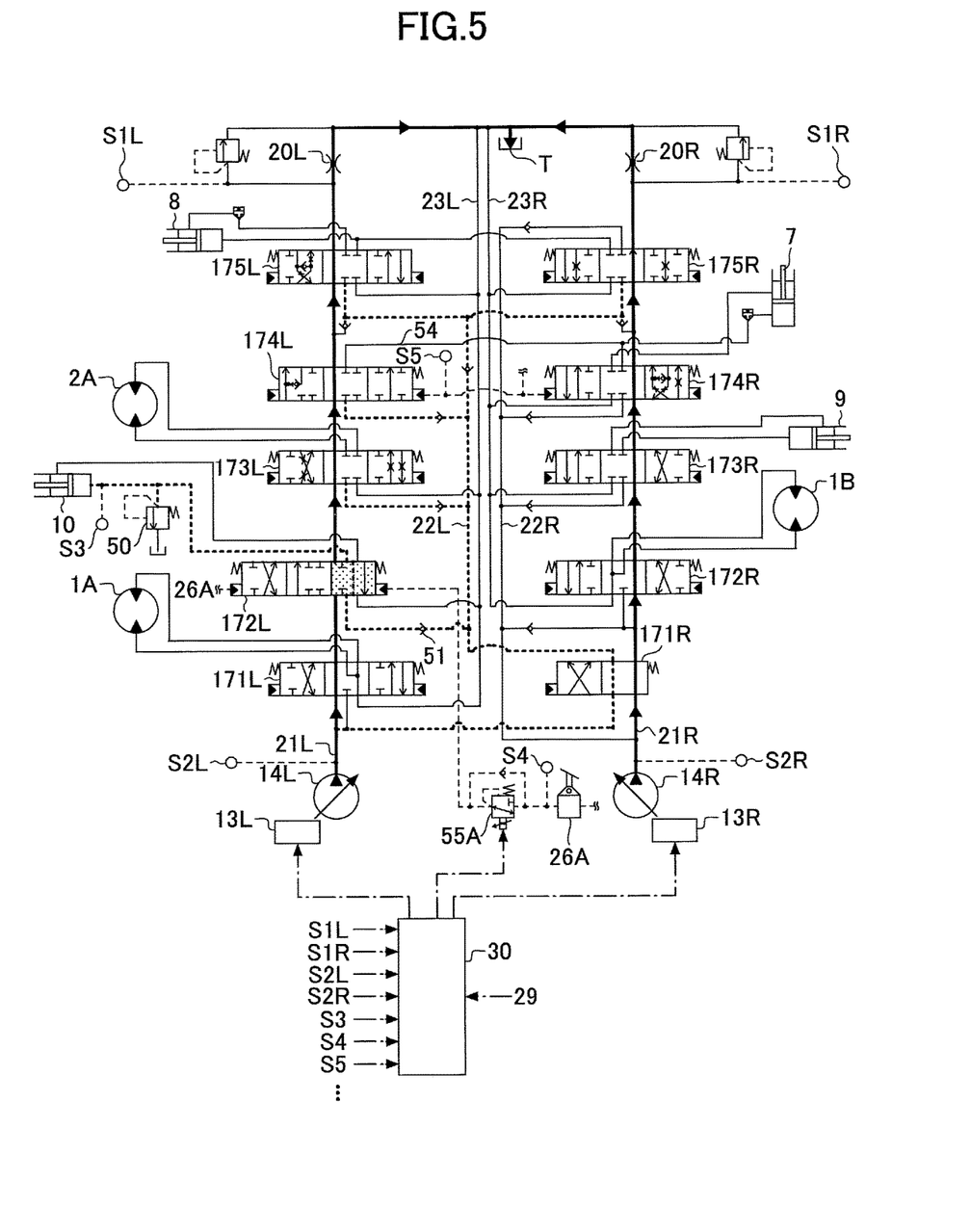
FIG. 5 is a diagram illustrating a state of the hydraulic circuit in FIG. 3 when the pilot pressure adjustment is started.

FIG. 5 is a diagram illustrating a state of the hydraulic circuit in FIG. 3 when the pilot pressure adjustment is started, wherein a bold solid line arrows in the figure indicates a flow direction of the hydraulic oil. A thick dotted line in this figure represents a state in which the pressure of the hydraulic oil is substantially equal to the predetermined pressure TH1. The discharge pressure P1 of the main pump 14L is smaller than the predetermined pressure TH1. Hatching in this figure indicates that the control valve 172L is located at an intermediate position between the neutral position and the right position by the pilot pressure adjustment.

Specifically, FIG. 5 depicts a state of the hydraulic circuit in a case in which the closing operation of the grapple 6 is performed independently, wherein for example, when the attachment is in the state A1 in FIG. 1, the closing operation of the grapple 6 is performed independently and the state of the hydraulic circuit after the grapple 6 grips the work target (after a movement of the claw 6a in a closing direction has stopped). Before reaching the state in FIG. 5, the hydraulic oil discharged from the main pump 14L flows into the bottom side oil chamber of the grapple opening/closing cylinder 10, the pressure of the hydraulic oil in the oil passage connected to the bottom side oil chamber and in the parallel oil passage 22L (refer to the thick dotted line portion in FIG. 5) is increased to the predetermined pressure TH1. The controller 30 increases the discharge amount L1 of the main pump 14L by the nega-con control. This is because the control valve 172L blocks the center bypass oil passage 21L, and the nega-con pressure decreases. The grapple bottom pressure does not reach the predetermined pressure TH1 until the grapple 6 grips the work target, that is, until the movement of the claw 6a in the closing direction stops. When the claw 6a moves in the closing direction, the bottom side oil chamber of the grapple opening/closing cylinder 10 becomes large and receives the hydraulic oil discharged from the main pump 14L. The grapple bottom pressure increases as the grapple 6 compresses the work target, that is, as the movement of the claw 6a in the closing direction becomes slower. When the grapple bottom pressure reaches the predetermined pressure TH1, an inflow of the hydraulic oil into the bottom side oil chamber is stopped, and the movement of the claw 6a in the closing direction is stopped. Therefore, a state, in which the grapple bottom pressure is higher than the predetermined pressure TH1, represents a state after the grapple 6 has grasped the work target.

Thereafter, the controller 30 increases the magnitude of the control current to the pressure reducing valve 55A until the discharge pressure P1 of the main pump 14L becomes lower than or equal to the predetermined pressure TH1 (<closed relief pressure) by the pilot pressure adjustment, and moves the control valve 172L in a direction returning to the neutral position. Then, the PC opening area of the control valve 172L is reduced and a PT opening area is increased. Therefore, the hydraulic oil discharged from the main pump 14L is exhausted to the hydraulic oil tank T through the PT opening of the control valve 172L and the center bypass oil passage 21L. Moreover, the controller 30 reduces the discharge amount L1 of the main pump 14L by the nega-con control. This is because the nega-con control pressure increases due to the hydraulic oil passing through the PT opening of the control valve 172L. As a result, the discharge pressure P1 of the main pump 14L decreases.

Thereafter, when the discharge pressure P1 of the main pump 14L becomes lower than of equal to the predetermined pressure TH1, the controller 30 fixes the magnitude of the control current with respect to the pressure reducing valve 55A and brings the control valve 172L to a standstill. As a result, the hydraulic circuit reaches the state depicted in FIG. 5, the controller 30 can prevent the hydraulic oil from being discharged from the relief valve 50, and can reduce the amount of hydraulic oil flowing out to the hydraulic oil tank T through the center bypass oil passage 21L. The grapple bottom pressure does not decrease even if the discharge pressure P1 becomes less than or equal to the predetermined pressure TH1. This is because the load check valve 51 prevents the hydraulic oil in the grapple opening/closing cylinder 10 from flowing back to the parallel oil passage 22L.

Next, another state of the hydraulic circuit in FIG. 3 when the pilot pressure adjustment is started will be described with reference to FIG. 6. The thick solid line arrow in this figure represents the flow direction of the hydraulic oil, and the thicker the solid line is, the larger the flow rate of the hydraulic oil is. Hatching in this figure indicates that the control valve 172L is located at an intermediate position between the neutral position and the right position by pilot pressure adjustment.

Figure 6:
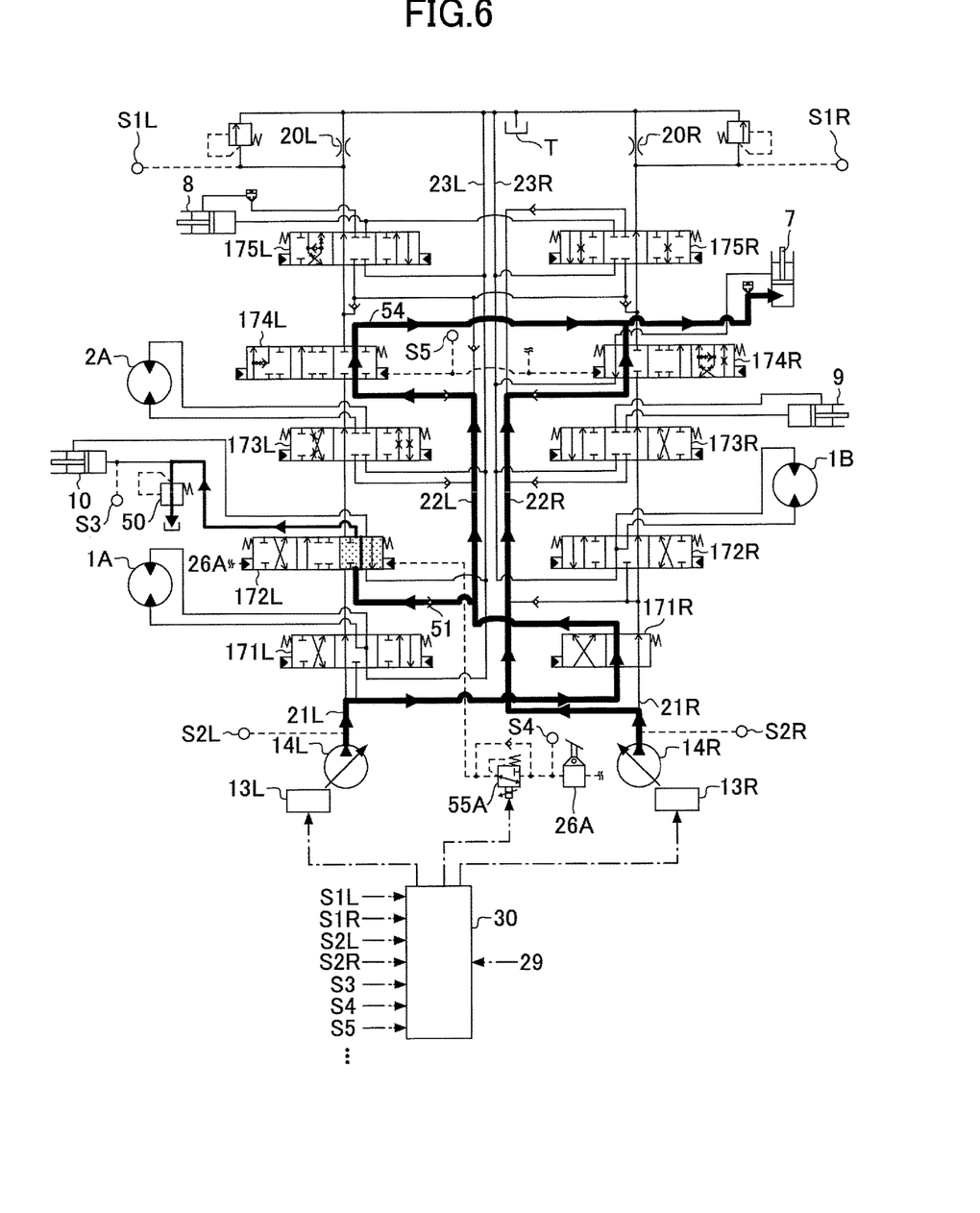
FIG. 6 is a view illustrating another state of the hydraulic circuit in FIG. 3 when the pilot pressure adjustment is started.

Specifically, FIG. 6 depicts the state of the hydraulic circuit in a case in which a combination operation of the closing operation of the grapple 6 and the raising operation of the boom 4 is performed in the state illustrated in FIG. 5. Also, a state in which the pressure of the hydraulic oil (Hereinafter, referred to as "load pressure") in the bottom side oil chamber of the boom cylinder 7 is higher than the closing relief pressure. In this case, the discharge pressure P1 of the main pump 14L becomes higher than the closing relief pressure, that is, the predetermined pressure TH1. Therefore, the hydraulic oil discharged from the main pump 14L passes through the control valve 172L and the relief valve 50, and is discharged to the hydraulic oil tank T.

Therefore, the controller 30 increases the magnitude of the control current to the pressure reducing valve 55A by the pilot pressure adjustment, and moves the control valve 172L in a direction returning to the neutral position. Then, the PC opening area of the control valve 172L is reduced and the PT opening area is increased. The hydraulic oil from the main pump 14L is not discharged to the hydraulic oil tank T through the PT opening of the control valve 172L and the center bypass oil passage 21L. This is because the center bypass oil passage 21L is blocked by the control valve 174L. As a result, it is possible to suppress or prevent the discharge of the hydraulic oil from the relief valve 50, and to increase the amount of hydraulic oil flowing into the bottom side oil chamber of the boom cylinder 7 through the parallel oil passage 22L and the control valve 174L.

When the discharge pressure P1 of the main pump 14L becomes lower than or equal to the predetermined pressure TH2, the controller 30 reduces the magnitude of the control current to the pressure reducing valve 55A and moves the control valve 172L toward the right position. Then, the PC opening area of the control valve 172L is increased and the PT opening area is reduced. However, even if the PC opening area of the control valve 172L increases, the grapple bottom pressure does not decrease. This is because the load check valve 51 prevents the hydraulic oil in the grapple opening/closing cylinder 10 from flowing back to the parallel oil passage 22L.

Next, with reference to FIG. 7, yet another state of the hydraulic circuit in FIG. 3 when pilot pressure adjustment is started will be described. The heavy solid arrow in the figure represents the flow direction of hydraulic oil. The thick dotted line in the figure represents a state in which the pressure of the hydraulic oil is substantially equal to the predetermined pressure TH1.

Figure 7:
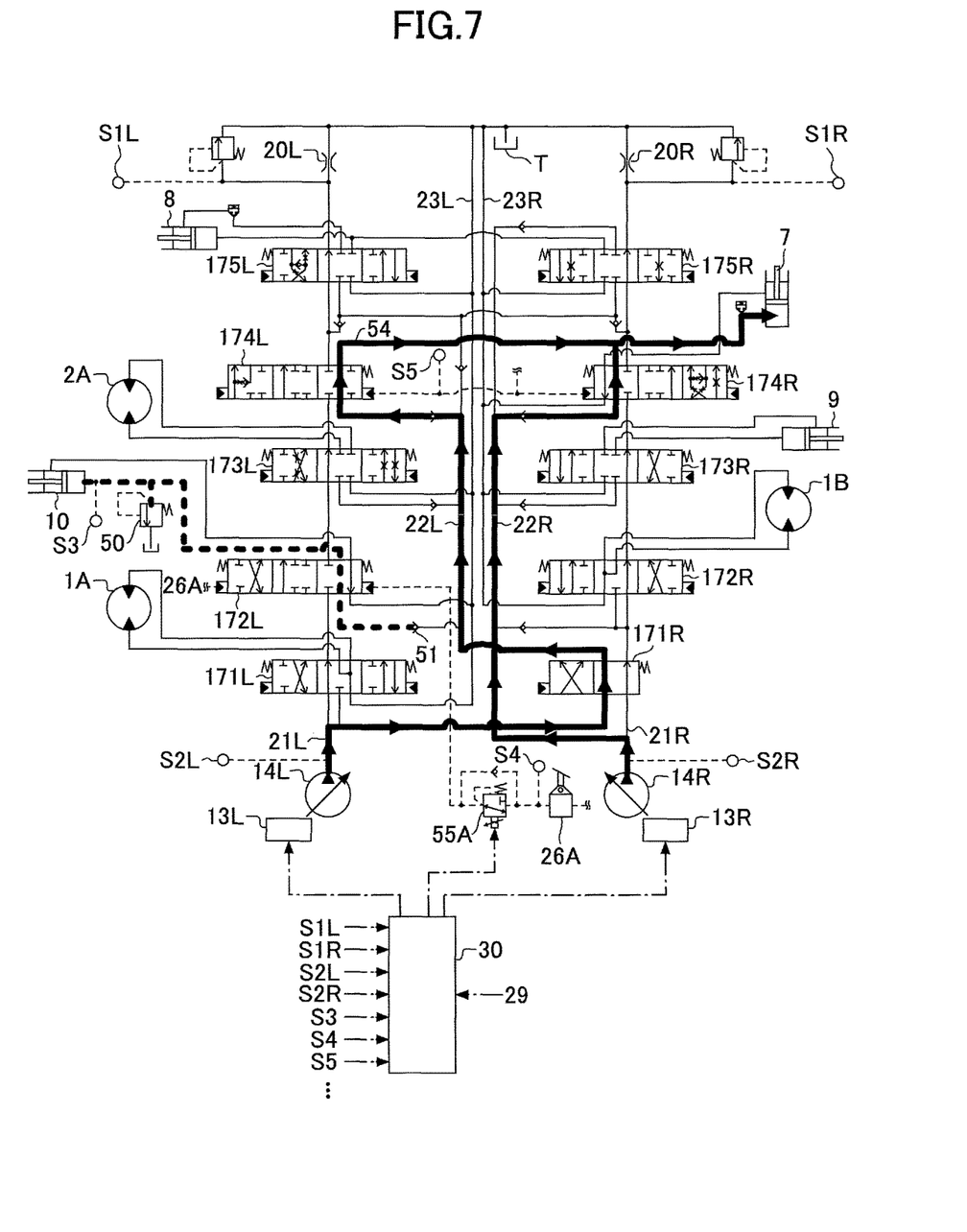
FIG. 7 is a diagram illustrating yet another state of the hydraulic circuit in FIG. 3 when the pilot pressure adjustment is started.

Specifically, FIG. 7 depicts the state of the hydraulic circuit in a case in which the combination operation of the closing operation of the grapple 6 and the raising operation of the boom 4 is further continued in the state illustrated in FIG. 6, wherein for instance, depicts the state of the hydraulic circuit when a turning radius of the attachment becomes less than the predetermined value. Also, the load pressure of the boom cylinder 7 is lower than the closing relief pressure. In this case, the discharge pressure P1 of the main pump 14L is lower than the closing relief pressure and lower than the predetermined pressure TH1. Therefore, regardless of a size of the PC opening area of the control valve 172L, regarding the hydraulic oil (refer to the thick dotted line portion in FIG. 7) in the oil passage connected to the bottom side oil chamber of the grapple opening/closing cylinder 10, the flow into the parallel oil passage 22L is blocked by the load check valve 51. Even if the discharge pressure P1 changes, the grapple bottom pressure does not change. Therefore, if the pilot pressure adjustment, which reduces the PC opening area of the control valve 172L, is adopted when the grapple bottom pressure is greater than the predetermined pressure TH1, the PC opening area is unlimitedly reduced by the pilot pressure adjustment.

Therefore, if the discharge pressure P1 of the main pump 14L is lower than or equal to the predetermined pressure TH1, the controller 30 maintains the PC opening area of the control valve 172L at the current state, and if the discharge pressure P1 is lower than or equal to the predetermined pressure TH2, the controller 30 increases the PC opening area of the control valve 172L. That is, it is possible to prevent the PC opening area of the control valve 172L from remaining in a reduced state. Therefore, even if a collapse of the work target grasped by the grapple 6 is caused, and the pressure of the hydraulic oil in a thick dotted line portion, that is, the grapple bottom pressure is dropped below the discharge pressure P1 of the main pump 14L, the hydraulic oil discharged from the main pump 14L can flow quickly into the bottom side oil chamber of the grapple opening/closing cylinder 10 through the load check valve 51 and the control valve 172L. As a result, the controller 30 quickly supplies sufficient hydraulic oil to the bottom side oil chamber of the grapple opening/closing cylinder 10, even if the collapse occurs in the work target grasped by the grapple 6. Hence, it is possible to quickly realize an additional grasping of the grapple 6.

As described above, when the grapple bottom pressure exceeds the predetermined pressure TH1, the controller 30 automatically reduces the PC opening area of the control valve 172L. Therefore, instead of discharging the hydraulic oil from the main pump 14L via the relief valve 50, the hydraulic oil is caused to pass through the center bypass oil passage 21L, and the discharge amount L1 can be reduced by the nega-con control. As a result, when the grapple closing operation is continued, it is possible to reduce the amount of hydraulic oil that is wastefully discharged.

Even if the load pressure of the boom cylinder 7 is higher than or equal to the closing relief pressure, the controller 30 controls the hydraulic oil from the main pump 14L while suppressing the discharge of the hydraulic oil from the main pump 14L through the relief valve 50. Specifically, the hydraulic oil from the main pump 14L can be joined with the hydraulic oil from the main pump 14R via a joining passage 54 and flow into the boom cylinder 7. As a result, even if a load pressure of the boom cylinder 7 is higher than or equal to the closing relief pressure, the amount of hydraulic oil flowing into the boom cylinder 7 can be increased. Hence, it is possible to prevent the rising speed of the boom 4 from being slowed down during the combination operation of the grapple closing operation and the boom raising operation.

Even if the load pressure of the boom cylinder 7 is lower than the closing relief pressure, that is, even if the grapple bottom pressure does not change due to the existence of the load check valve 51, the controller 30 can perform the pilot pressure adjustment depending on the magnitude of the discharge pressure P1 of the main pump 14L. Therefore, even if the load pressure of the boom cylinder 7 becomes smaller than the closing relief pressure during the combination operation of the grapple closing operation and the boom lifting operation, and the load collapses to the work target gripped by the grapple 6 occur, it is possible to promptly realize additional gripping of the grapple 6 by quickly supplying sufficient hydraulic oil to the bottom side oil chamber of the grapple opening and closing cylinder 10.

Figure 8A:
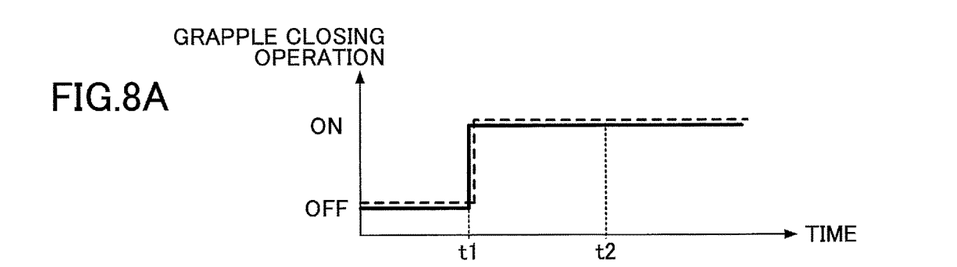
FIG. 8A through FIG. 8E are diagrams illustrating temporal transitions of various physical quantities when the pilot pressure adjustment is performed.
Figure 8B:
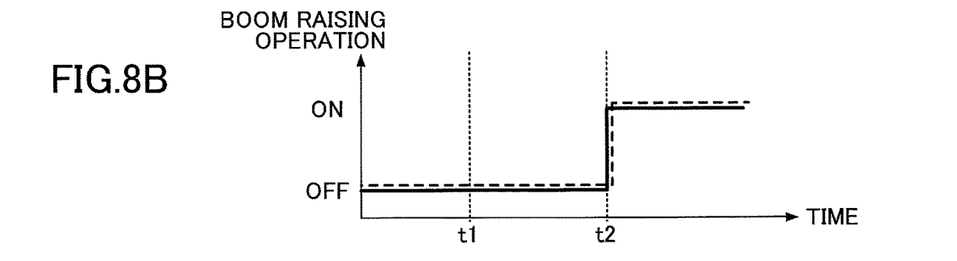

Next, with reference to FIG. 8A through FIG. 8E, the temporal transitions of various physical quantities will be described in a case in which the pilot pressure adjustment is performed. FIG. 8A through FIG. 8E illustrates temporal transitions of various physical quantities when the pilot pressure adjustment is performed. Specifically, FIG. 8A illustrates an ON/OFF state of the grapple closing operation, an ON/OFF state of the boom raising operation, the discharge amount L1 of the main pump 14L, the discharge amount L2 of the main pump 14R, and the temporal transition of a boom flow rate is indicated. The ON state of the grapple closing operation means a state in which the grapple opening/closing cylinder 10 is operated with a full pedal, and the ON state of the boom raising operation means a state of operating the boom cylinder 7 with the full lever. The boom flow rate means the flow rate of the hydraulic oil flowing into the bottom side oil chamber of the boom cylinder 7. In FIG. 8, as a comparison, the solid line depicts a time course for a case in which the pilot pressure adjustment is executed, and the broken line depicts the time course for a case in which the pilot pressure adjustment is not executed.

As illustrated in FIG. 8A, when the grapple closing operation is turned ON at time t1, the controller 30 starts the pilot pressure adjustment. Specifically, when the controller 30 detects that the discharge pressure P1, which is the output of the pressure sensor S2L, is higher than the predetermined pressure TH1, and that the grapple bottom pressure, which is the output of the pressure sensor S3, is higher than the predetermined pressure TH1, the controller 30 starts the pilot pressure adjustment so that the PC opening area of the control valve 172L is reduced and the PT opening area is increased.

Figure 8C:
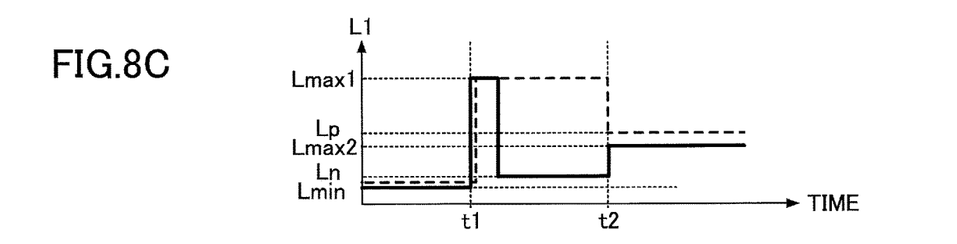
Figure 8D:
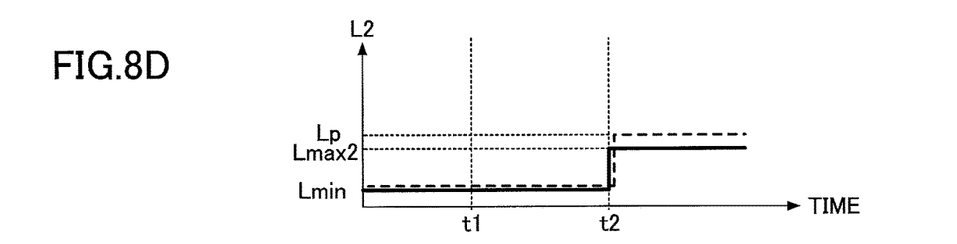

As a result, referring to FIG. 8C, the discharge amount L1 of the main pump 14L is increased from a lower limit value Lmin used for a case in which none of a related hydraulic actuators are operated, to an upper limit value Lmax1 determined by a full horsepower control, and is reduced to a determined flow rate Ln, which is determined by the nega-con control. This is because the pilot pressure adjustment is performed when the grapple bottom pressure exceeds the predetermined pressure TH1. The discharge amount L2 of the main pump 14R is the lower limit value Lmin used for the case in which none of the related hydraulic actuators are operated. The total horsepower control is control for determining the discharge amounts L1 and L2 so that a total absorbing horsepower of the main pump 14 does not exceed an output horsepower of the engine 11. Specifically, the total absorbing horsepower T is expressed by $T=k \times (P1 \times L1 + P2 \times L2)$. K denotes a coefficient. In a case of maintaining the total absorbed horsepower T to be a constant, the upper limit value Lmax1 is expressed by $(T/k - P2 \times L2)/P1$.

When the PT opening area is increased, the hydraulic oil discharged from the main pump 14L is discharged to the hydraulic oil tank T through the center bypass oil passage 21L. Hence, the hydraulic oil is not discharged to the hydraulic oil tank T through the relief valve 50.

Thereafter, when the boom raising operation is turned ON at time t2 (FIG. 8B), the nega-con control is stopped and the full horsepower control is performed. As a result, the discharge amount L1 of the main pump 14L is increased to the upper limit value Lmax2 (<Lmax1) determined by the full horsepower control (FIG. 8C). In a discharge amount tuning method, when both the boom 4 and the grapple 6 are continuously operated with the full lever or the full pedal, since L1=L2=Lmax2, the upper limit value Lmax2 is represented by $T/(k \times (P1+P2))$. The discharge amount L2 of the main pump 14R is also the same discharge amount Lmax2 as the discharge amount L1 of the main pump 14L.

Figure 8E:
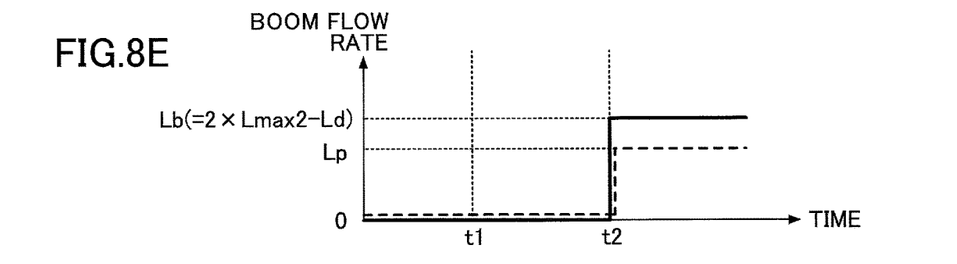

As a result, the boom flow rate is a value Lb obtained by subtracting the flow rate Ld discharged from the relief valve 50 from a sum of the discharge amount Lmax2 of the main pump 14L and the discharge amount Lmax2 of the main pump 14R (FIG. 8E).

In a case in which the pilot pressure adjustment is not performed, when the grapple closing operation is turned ON at time t1 (FIG. 8A), the discharge amount L1 of the main pump 14L is increased from the lower limit value Lmin to the upper limit value Lmax1 as indicated by the broken line in FIG. 8C, and remains at the upper limit value Lmax1. This is because the horsepower control is continued and the nega-con control has not been started. From time t1 to time t2, the hydraulic oil discharged from the main pump 14L passes through the relief valve 50 and is discharged to the hydraulic oil tank T.

Thereafter, when the boom raising operation is turned on at time t2 (FIG. 8B), the discharge amount L1 of the main pump 14L is reduced to the same flow rate Lp as the discharge amount L2 of the main pump 14R by total horsepower control in a discharge amount tuning method (FIG. 8C). The boom flow rate is also limited to the flow rate Lp. This is because when the load pressure of the boom cylinder 7 is higher than the closing relief pressure, the hydraulic oil from the main pump 14L and the hydraulic oil from the main pump 14R can not be joined together. Specifically, even if the discharge pressure P1 of the main pump 14L is increased to the load pressure of the boom cylinder 7, the hydraulic oil discharged by the main pump 14L is exhausted from the relief valve 50.

As described above, in a case in which the pilot pressure adjustment is not executed, if the load pressure of the boom cylinder 7 is higher than the closing relief pressure, the boom flow rate is limited to the flow rate Lp and an ascending speed of the boom 4 becomes slower than a case in which the pilot pressure adjustment is performed.

By the above described configuration, the controller 30 can reduce the amount of hydraulic oil, which is wastefully discharged from the relief valve 50 when an independent closing operation of the grapple 6 is performed.

Moreover, even in a case in which the load pressure of the boom cylinder 7 is higher than the closing relief pressure during the combination operation of the closing operation of the grapple 6 and the raising operation of the boom 4, the hydraulic oil from the main pump 14L can be combined with the hydraulic oil from the main pump 14R to flow into the boom cylinder 7 while suppressing or preventing the discharge of the hydraulic oil through the relief valve 50.

Figure 9:
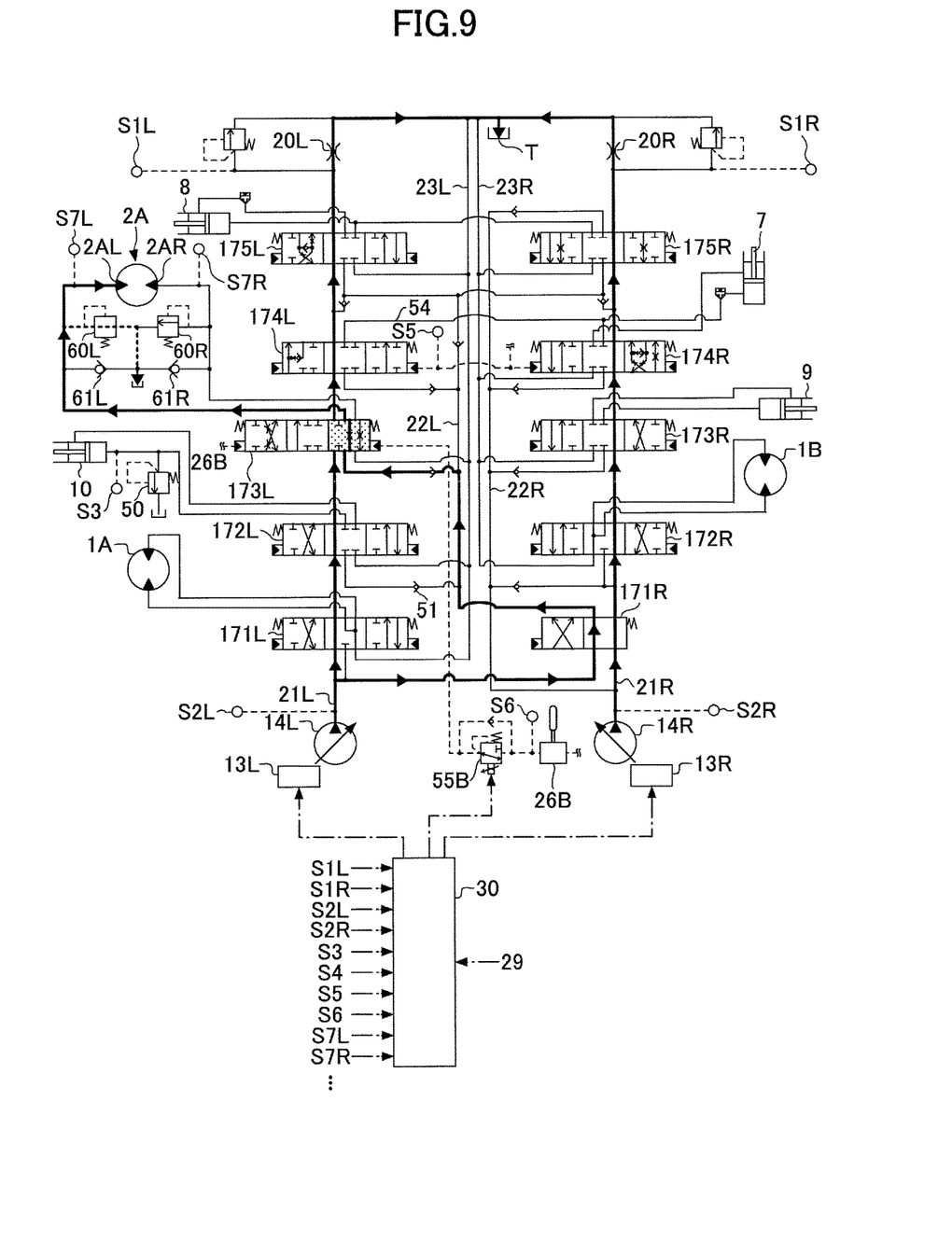
FIG. 9 is a view illustrating still another state of the hydraulic circuit in FIG. 3 when pilot pressure adjustment is started.

Next, referring to FIG. 9, a case, in which the pilot pressure adjustment is used, except for the closing operation of the grapple, will be described. FIG. 9 is a diagram illustrating another state of the hydraulic circuit in FIG. 3 when pilot pressure adjustment is started. In FIG. 9, differently from the hydraulic circuit in FIG. 3, the grapple opening/closing pedal 26A, the pressure reducing valve 55A, and the pressure sensor S4 are omitted. Instead, a revolving control lever 26B, a pressure reducing valve 55B, and a pressure sensor S6 are illustrated. In addition, the details of the revolving hydraulic circuit including the revolving hydraulic motor 2A are depicted. Other than the above described difference, the hydraulic circuit in FIG. 9 is similar to that in FIG. 3. Therefore, newly illustrated portions will be described in detail.

The revolving operation lever 26B is one of the operation devices 26, and generates a pilot pressure (hereinafter, referred to as "right pilot pressure") acting on the right pilot port of the control valve 173L and a pilot pressure (hereinafter, referred to as "Left revolving pilot pressure") acting on the left pilot port of the control valve 173L.

The pressure reducing valve 55B is a valve for adjusting the right revolving pilot pressure generated by the turning operation lever 26B, and the pressure reducing valve 55B adjusts the right revolving pilot pressure depending on the magnitude of the control current from the controller 30. Specifically, the pressure reducing valve 55B receives the right revolving pilot pressure as the primary pressure, and applies the adjusted pilot pressure as the secondary pressure to the right pilot port of the control valve 173L. The pressure reducing valve 55B reduces the secondary pressure as the control current increases. For a pressure reducing valve (not shown) for adjusting the left revolving pilot pressure, the same manner is applied.

The pressure sensor S6 is one of the pressure sensors 29, and detects the right revolving pilot pressure, and outputs the detected value to the controller 30 as an electric right revolving pilot pressure signal. For a pressure sensor (not shown) for detecting the left revolving pilot pressure, the same manner is applied.

The revolving hydraulic circuit is a hydraulic circuit for driving the revolving mechanism 2, and includes the revolving hydraulic motor 2A, revolving relief valves 60L and 60R, check valves 61L and 61R, and pressure sensors S7L and S7R.

The revolving relief valve 60L is a valve that controls the pressure of the hydraulic oil on a left port 2AL side of the revolving hydraulic motor 2A to be lower than or equal to a predetermined revolving relief pressure. The revolving relief valve 60R is a valve that controls the pressure of the hydraulic oil on a right port 2AR side of the revolving hydraulic motor 2A to be lower than or equal to a predetermined revolving relief pressure.

The check valve 61L is a valve for maintaining the pressure of the hydraulic oil on the left port 2AL side of the revolving hydraulic motor 2A to be higher than or equal to the pressure of the hydraulic oil in the hydraulic oil tank T. The check valve 61R is a valve that maintains the pressure of the hydraulic oil on the right port 2AR side of the revolving hydraulic motor 2A to be higher than or equal to the pressure of the hydraulic oil in the hydraulic oil tank T.

The pressure sensors SL and SR are an example of a state detector that detects the state of the revolving hydraulic motor 2A. In the present embodiment, the pressure sensor S7L detects the pressure of the hydraulic oil on the left port 2AL side of the revolving hydraulic motor 2A (hereinafter, referred to as "left port pressure"), and outputs the detected value as an electrical left port pressure signal to the controller 30. The pressure sensor S7R detects the pressure of hydraulic oil on the right port 2AR side of the revolving hydraulic motor 2A (hereinafter, referred to as "right port pressure"), and outputs the detected value as an electrical right port pressure signal to the controller 30.

FIG. 9 depicts a state of the hydraulic circuit in a case in which the hydraulic oils discharged from the main pump 14L is caused to flow into the left port 2AL of the revolving hydraulic motor 2A to accelerate the revolving hydraulic motor 2A. Specifically, the right revolving pilot pressure generated by the revolving operation lever 26B acts on the right side pilot port of the control valve 173L, the control valve 173L moves to the left, and the hydraulic oil from the main pump 14L is flowed into the left port 2AL of the motor 2A.

Similar to the case of the closing operation of the grapple 6, when the left port pressure that is the output of the pressure sensor S7L is higher than a predetermined pressure TH3, the controller 30 decreases the PC opening area of the control valve 173L and increase the PT opening area. The predetermined pressure TH3 is a value stored in advance in the ROM or the like, and is set to a slightly lower pressure than the revolving relief pressure. Specifically, the controller 30 increases the control current for the pressure reducing valve 55B. As the control current increases, the pressure reducing valve 55B reduces the adjusted pilot pressure acting on the right side pilot port of the control valve 173L. Therefore, a part of the hydraulic oil discharged from the main pump 14L reaches the hydraulic oil tank T through a PT opening of the control valve 173L and the center bypass oil passage 21L. As a result, the controller 30 reduces the discharge amount L1 of the main pump 14L by the nega-con control. The left port pressure is maintained at the predetermined pressure TH3, and the discharge of the hydraulic oil through the revolving relief valve 60L (refer to the thick dotted arrow in this figure) is suppressed or prevented.

By the above configuration, the controller 30 can reduce the amount of hydraulic oil that is wastefully discharged from the revolving relief valves 60L and 60R when the revolving acceleration operation is performed alone.

Although the preferred embodiment of the present invention have been described in detail above, the present invention is not limited to the above-described embodiments, and various modifications and substitutions may be additionally made to the above described embodiments without departing from the scope of the present invention.

For example, in the above described embodiment, the pilot pressure adjustment is performed when the grapple 6 is closed alone, the combination operation of the closing operation of the grapple 6 and the raising operation of the boom 4, or the revolving acceleration operation is performed. However, the present invention is not limited to this configuration. For example, the pilot pressure adjustment may be performed in a case of conducting the combination operation of closing operation of the grapple 6 and opening operation of the arm 5, the combination operation of closing operation of the grapple 6 and revolving acceleration operation, the combination operation of revolving acceleration operation and raising operation of the boom 4, or another combination operation including at least one of the closing operation of the grapple 6 and the revolving acceleration operation. Also, the pilot pressure adjustment related to the closing operation of the grapple 6 and the pilot pressure adjustment related to the revolving acceleration operation may be performed at the same time.

In the embodiment described above, the pilot pressure adjustment is performed in the working machine having the grapple opening/closing cylinder 10. However, the present invention is not limited to this configuration. For example, the pilot pressure adjustment may be performed on the working machine having another hydraulic actuator that drives while the hydraulic oil is relieved. For example, it may be performed when the revolving acceleration operation is performed by a shovel having a bucket instead of the grapple 6 and having a revolving hydraulic motor.

According to the above described embodiment, a working machine is provided which can reduce an amount of the hydraulic oil discharged from the relief valve during the operation of the hydraulic actuator.

For example, reference symbols designate as follows:
1 . . . lower traveling bodies
1A, 1B . . . traveling hydraulic motors
2 . . . revolving mechanism
2A . . . revolving hydraulic motor
3 . . . upper revolving body
4 . . . boom
5 . . . arm
6 . . . grapple
7 . . . boom cylinder
8 . . . arm cylinder
9 . . . bucket cylinder
10 . . . grapple opening/closing cylinder
11 . . . engine
13, 13L, 13R . . . regulators
14, 14L, 14R . . . main pumps
15 . . . pilot pump
17 . . . control valve
20L, 20R . . . negative control throttles
21L, 21R . . . center bypass oil passages
22L, 22R . . . parallel oil passages
23L, 23R . . . return oil passages
26 . . . operating device
26A . . . grapple opening/closing pedal
26B . . . revolving control lever
29 . . . pressure sensor
30 . . . controller
50 . . . relief valve
51 . . . load check valve
54 . . . merging passage
55A, 55B . . . pressure reducing valves
60L, 60R . . . revolving relief valves
61L, 61R . . . check valves
171L through 175L . . . control valves
S1L, S1R, S2L, S2R, S3, S4, S5, S6, S7L, S7R pressure sensors
T . . . hydraulic oil tank It should be understood that the invention is not limited to the above-described embodiment, but may be modified into various forms on the basis of the spirit of the invention. Additionally, the modifications are included in the scope of the invention.

What is claimed is:

1. A working machine comprising:
an arm;
a boom that supports the arm;
an upper revolving body that supports the boom;
a lower traveling body that mounts the upper revolving body in a rotatable state;
a first hydraulic actuator that is driven while a relief valve relieves a hydraulic oil;
a first pump that supplies the hydraulic oil to the first hydraulic actuator;
a second hydraulic actuator that is driven by the first pump;
a control valve that switches a flow of the hydraulic oil in order to supply the hydraulic oil discharged by the first pump to the first hydraulic actuator;
a pump state detector that detects load of the first pump;
a hydraulic actuator state detector that detects load of the first hydraulic actuator; and
a controller that reduces a flow rate of the hydraulic oil from the first pump to the first hydraulic actuator in a case where the hydraulic actuator state detector determines that a detection value of the hydraulic actuator state detector exceeds a predetermined pressure,
wherein the hydraulic oil is supplied at the reduced flow rate to the second hydraulic actuator, when a combined operation of the first hydraulic actuator and the second hydraulic actuator is performed.

2. The working machine as claimed in claim 1, wherein the first hydraulic actuator is a hydraulic actuator that opens and closes a grapple supported by the arm.

3. The working machine as claimed in claim 2, further comprising:
a second pump that supplies the hydraulic oil to a boom cylinder; and
a joining passage that joins a first hydraulic oil discharged from the first pump and a second hydraulic oil discharged from the second pump.

4. The working machine as claimed in claim 2, further comprising:
a control valve that switches a flow of the hydraulic oil in order to supply the hydraulic oil discharged from the first pump to the hydraulic actuator,
wherein the relief valve causes at least a part of the hydraulic oil flowing toward the first hydraulic actuator in response to a closing operation of the grapple, and
the controller reduces a pilot pressure acting on a pilot port of the control valve in a case where the pump state detector detects that a pressure of the hydraulic oil flowing to the first hydraulic actuator exceeds a preset pressure, which is defined based on a relief pressure of the relief valve, at time of the closing operation of the grapple.

5. The working machine as claimed in claim 4, further comprising:
an operating device that generates the pilot pressure for an opening/closing operation of the grapple; and
a pressure reducing valve arranged between the pilot port and the operating device, wherein the controller controls the pressure reducing valve to reduce the pilot pressure acting on the pilot port.

6. The working machine as claimed in claim 4, wherein the controller increases the reduced pilot pressure when a detection value of the pump state detector becomes lower than the preset pressure.

7. The working machine as claimed in claim 5, wherein the controller controls the pressure reducing valve using a hysteresis control.

8. The working machine as claimed in claim 1, wherein the first hydraulic actuator is a revolving hydraulic motor.

* * * * *